June 26, 1951 E. M. DELORAINE ET AL 2,557,950

PULSE SPACING MODULATED COMMUNICATION SYSTEM

Filed Jan. 20, 1948 2 Sheets-Sheet 1

INVENTORS
EDMOND M. DELORAINE
BEN ALEXANDER
BY
RP Morris
ATTORNEY

PULSE SPACING MODULATED COMMUNICATION SYSTEM

Filed Jan. 20, 1948 2 Sheets-Sheet 2

INVENTORS
EDMOND M. DELORAINE
BEN ALEXANDER
BY
R P Morris
ATTORNEY

Patented June 26, 1951

2,557,950

UNITED STATES PATENT OFFICE 2,557,950

PULSE SPACING MODULATED COMMUNICATION SYSTEM

Edmond Maurice Deloraine, New York, N. Y., and Ben Alexander, Nutley, N. J., assignors to International Standard Electric Corporation, New York, N. Y., a corporation of Delaware Application January 20, 1948, Serial No. 3,235

11 Claims. (Cl. 179—15.6)

This invention relates to radio communication systems and more particularly to communication systems employing pulse modulation methods for conveying audio messages.

There are various communication methods making use of electrical pulses which are known to the art. In some cases, these pulses may be fixed in time but will vary in amplitude. In other cases, the amplitude has no bearing on the intelligence, the latter being conveyed by means of the shifting of the pulses with respect to a time base. Systems in which the pulses are shifted with respect to a time base have the advantage that the message to be transmitted is comparatively little affected by outside interference since such interference modifies in only a small measure the position of such pulses along a time axis. Additionally, in such systems, it is possible to completely block the receiver circuits during all of the time in which no pulse is to be received, which of course eliminates all possible interference during such time. It is to be noted that the minimum time during which the circuit is in a conduit to handle incoming signals is determined not by the shift of the pulse along the time axis, but by the wave shape of the pulses.

It is an object of the present invention to provide a communication system of the type referred to wherein intelligence, such as speech, is transmitted by the use of a two-pulse code, the time spacing between the pulses of consecutive pulses which are being transmitted being significant as to intelligence.

It is another object of the invention to provide a communication system of the type described wherein the transmitter includes means for transforming amplitude modulation into pulse time modulation.

It is still a further object to provide a receiver in a communication system of the type described wherein consecutive pulse pairs, the individual pulses of which are spaced in accordance with the intelligence are converted into individual positive and negative pulses significant of the intelligence input supplied to the transmitter which are demodulated into unit steps of voltage in accordance with the polarity of the pulses.

In accordance with certain feaures of the invention, the system includes a transmitter wherein the signal in the form of a complex wave such as speech is operated on by a series of circuits to translate such wave into secondary signals in the form of pulses which are modulated in two alternative variations of a given characteristic thereof. These circuits function to compare the audio input with a demodulated portion of the intelligence already transmitted. If the audio amplitude is less than that of the demodulated output, a signal for a more or less negative unit step is passed to the demodulator, otherwise a signal for a positive unit step is passed which is converted into a significantly modulated time spacing between pulses of a pair. At the receiver, the demodulation consists of transforming these pulse signals into unit steps of voltage, positive for one position, negative for the other. These unit steps are stored successively and, when subjected to low pass filtering, approximate the wave form of the input speech of the transmitter.

The above-mentioned and other features and objects of this invention will become more apparent and the invention itself though not necessarily defined by said features and objects will be best understood, by reference to the following description of an embodiment of the invention taken in connection with the accompanying drawings, wherein.

Figures 1, 3:
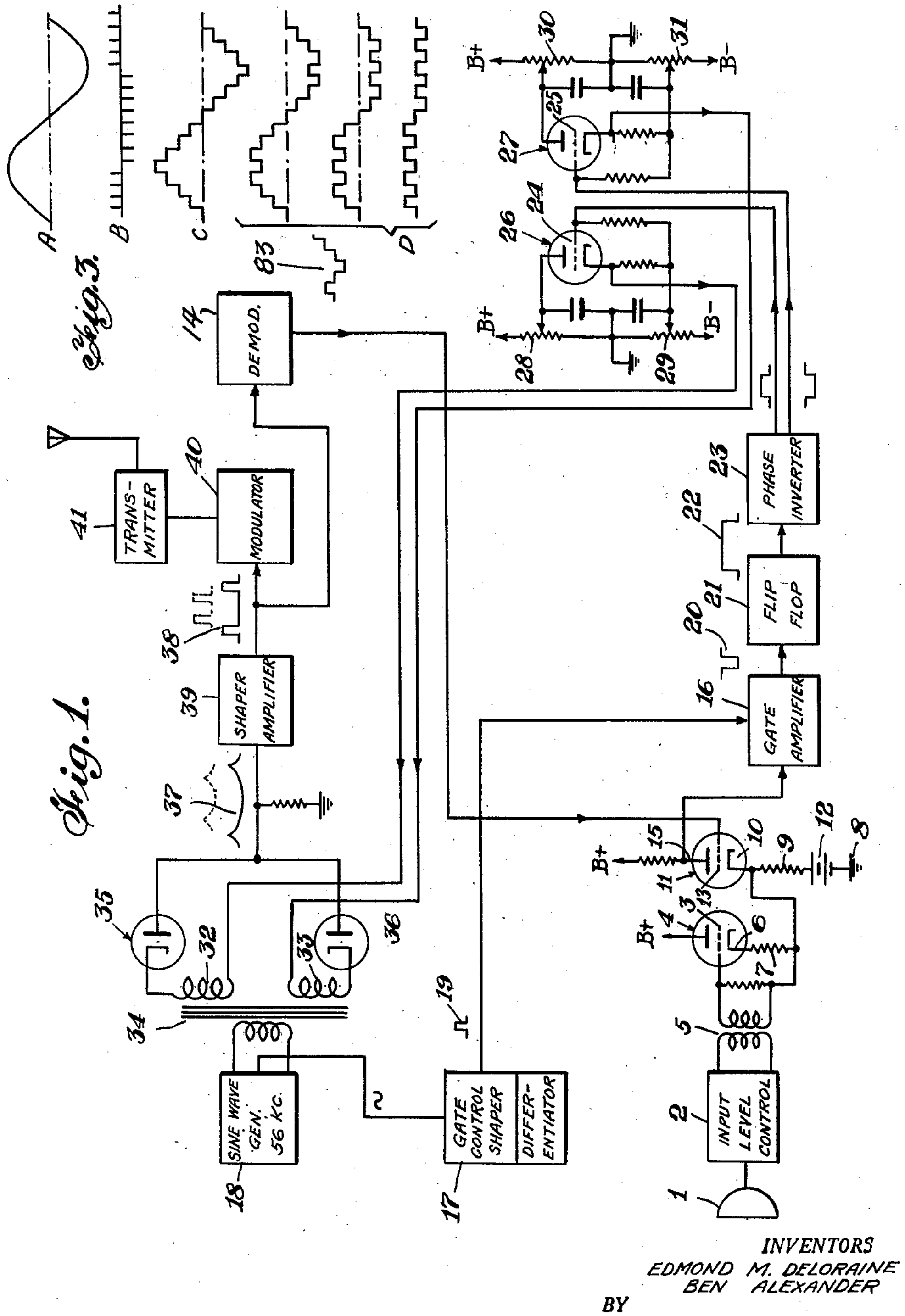
Fig. 1 represents, in schematic form, a view of a transmitter in accordance with my invention.
Figs. 3 and 4 are graphical representations of some operating voltages and currents of the systems of Figs. 1 and 2.

Referring to the transmitter of Fig. 1, it is shown to comprise speech input means such as a microphone 1 which feeds into a suitable input level control network indicated at 2. The input control preferably comprises circuits for raising the speech input to a desired level and limiting it as required. Output of the control circuit 2 is applied to grid 3 of a triode 4, by way of a coupling transformer 5.

The triode 4 includes a cathode circuit 6 and 7, the latter being the cathode resistance which is connected to ground at 8 through an additional resistance 9 in the cathode circuit 10 of another triode 11. It will be apparent that as the speech input is applied to the grid 3, a current proportionate thereto will flow through the cathode circuit 6 to ground 8 through the resistance 9. The triode 11 is operated as a sharp cut-off tube having a suitable source of potential such as a battery 12 in its cathode circuit 10. The potential of the battery 12 is chosen such that the tube 11 is biased slightly below cut-off when its grid 13 is at ground potential and the current in the cathode resistor 9, as determined by the voltage on the grid 3 of the triode 4, is of the magnitude which corresponds to no signal on the grid of the triode 4. The potential of grid 13 is controlled by the output of a demodulator 14, as will be explained hereinbelow. The output of the triode 11, as obtained from its anode circuit 15, is applied to a gate amplifier 16, which is effective in amplifying and then in inverting the signal from the triode 11. The gate of the circuit 16 may be made conductive by pulses obtained from a gate control 17. The gate amplifier is normally cut off and is driven to an operating condition by positive pulses from the gate control amplifier 17. The gate control 17 comprises an amplifier and a differentiating circuit which operates on the sine wave output of a generator 18. The resulting differentiated pulses are amplified, limited and rectified, yielding positive pulses of a given duration which occur at the bottom of the cycle of the sine wave of the generator 18, the pulse shape being indicated at 19. The output of the gate amplifier 16 is in the form of a negative pulse as shown at 20 which is present for the time the gate is opened by the control 17 and a signal has been passed into the gate amplifier 16 from the triode 11. These negative pulses trigger a flip-flop circuit 21 which includes circuit constants chosen so that when triggered, the circuit remains in the so-called "flipped" position for a given predetermined period. The output, therefore, of the circuit 21, comprises a rectangular pulse, as shown at 22, having a given duration beginning when the sine wave cycle of the generator 18 passes through a zero phase angle, if at that time a signal has been received at the gate amplifier 16 from the triode 11. This rectangular pulse 22 is fed to a conventional phase inverter indicated at 23 which yields two outputs, identical in shape and amplitude but reversed in polarity. These outputs are passed to grids 24 and 25 of triodes 26 and 27 respectively. Triodes 26 and 27 are operated as balanced cathode followers with variable plate and cathode voltage supplies shown at 28—31. These voltages are so adjusted that with no signal on the grids 24 and 25, a voltage is applied between split windings 32 and 33 of the secondary of transformer 34 in the circuit containing diodes 35 and 36, the transformer being supplied from the sine wave generator 18. The circuit including the two diodes 35 and 36 is essentially a cusper type circuit for pulse time modulation in accordance with that disclosed in the copending application of Emile Labin and Donald D. Grieg, Serial No. 455,897, filed August 24, 1942, now Patent No. 2,416,329, granted February 25, 1947. The output of the cusper circuit is shown at 37 to be composed of successive pairs of positive pulses at a given repetition rate which is controlled by the frequency of the sine wave generator 18. The spacing in time of the pulses of each pair, however, is a function of the voltage applied to rectifiers 35, 36 over the split windings of the secondary. The spacing with respect to time of the two pulses comprising a pulse pair as indicated at 37 is determined by the voltages as obtained from the triodes 25 and 26 in accordance with the speech input at the microphone 1, as will be explained hereinbelow. These pulses 37 are shaped into rectangular pulsations of a short duration as shown at 38 in the shaper amplifier circuit 39. The output of the shaper amplifier 39 is fed into a modulator 40 which in turn modulates a conventional transmitter 41 which sends out the time modulated pulse pairs.

Figures 2, 4:
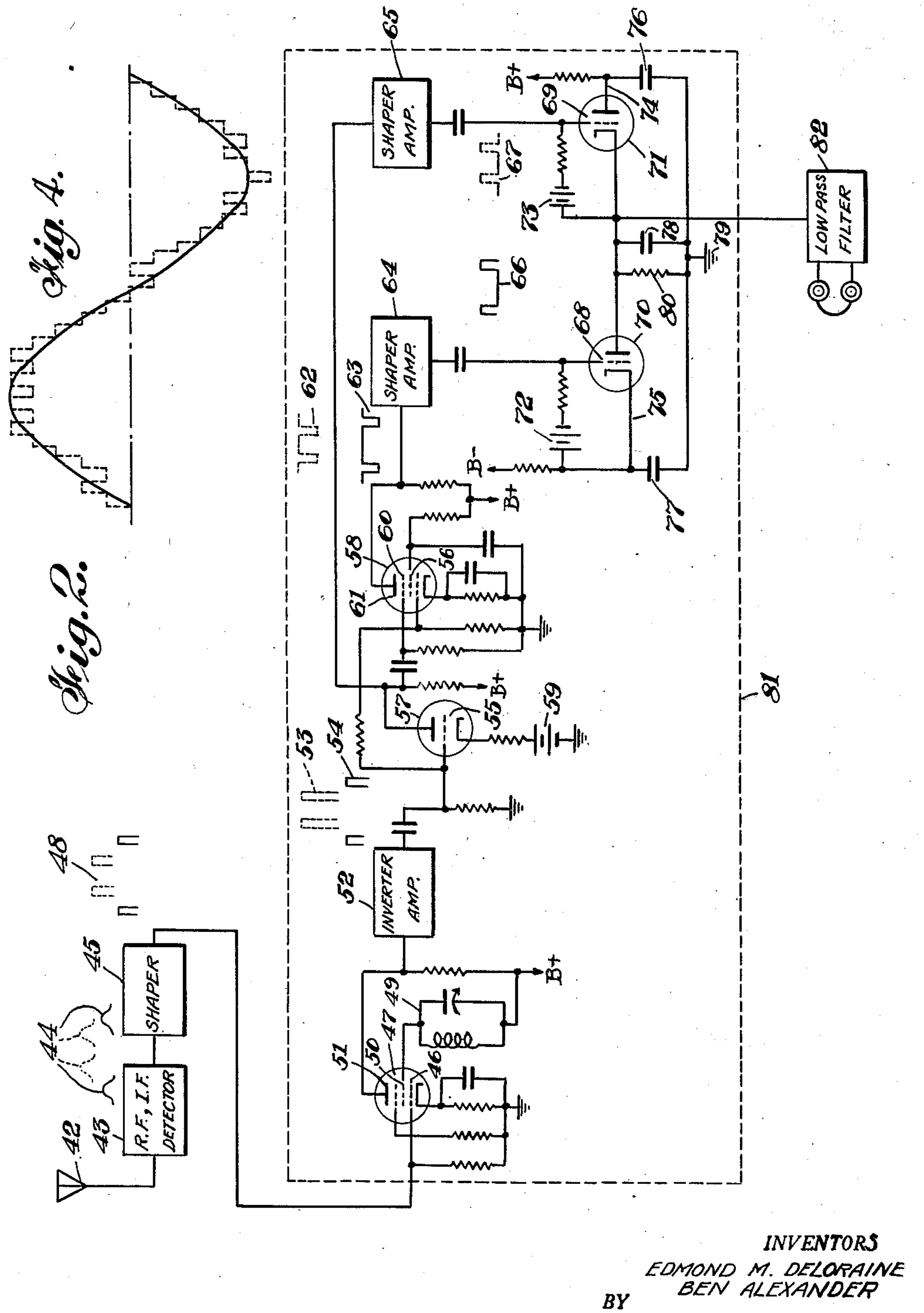
Fig. 2 is a view, in schematic form, of a receiver in accordance with my invention.

The receiver circuit shown in Fig. 2 consists of a conventional antenna 42 feeding into a radio frequency, intermediate frequency and detector circuit indicated by the block 43. The output of the detector 43 is in the form of pairs of pulses shown at 44. These are shaped into rectangular positive pulses of a given duration in a shaper circuit 45 and are passed to the first grid 46 of a pentode 47. The shape of these pulses is indicated at 48. A tuned circuit 49 is associated with pentode 47, connection for the circuit being made across screen grid 50 and plate 51 thereof. The pulses which are being fed through the pentode 47 are applied to the tuned circuit 49 exciting oscillations therein, the Q of the circuit being high enough so that such oscillations damp only slightly between excitations. The resulting sinusoidal oscillation of the potential on the screen grid 50 modulates the plate current of the pentode 47. The resulting plate voltage is made up of the sine wave due to the oscillatory circuit 49 plus the square pulses applied to the grid 46. As the pulses and the sine wave are combined, the amplitude of the pulses in the output of the pentode is dependent upon their position with respect to the highs and lows of the sine wave, which position in turn is dependent upon the relative spacing between the pulses of each pair. This combined output is applied to a threshold amplifier circuit 52 which has the function to remove the sine wave pedestal of the wave, to amplify and to invert the resulting pulses. Two pairs of pulses 53 and 54 exemplify the output of the inverter circuit after they have been separated from the sine wave for instances of both high and low amplitude. The pulses 53 and 54 thus obtained are applied in parallel to grids 55 and 56 of electron discharge tubes 57 and 58. Tube 57 is biased so that the low amplitude pulses do not drive the tube out of its cut-off condition. The bias is shown in the form of a battery 59 in the cathode circuit thereof. The low amplitude pulses are amplified in the tube 58. High amplitude pulses, however, drive the tube 57 to conduction. The high amplitude pulses appearing in the plate circuit of the tube 57 drive tube 58 to cut-off on its suppressor grid 60, preventing them from appearing on plate 61 thereof. The low and high amplitude pulses are thus separated into two different outputs. These sparated pulse pairs are indicated at 62 and 63 respectively. The output pulses 62 and 63, now having an inverted polarity, are amplified to a larger value and clipped and limited in the respective shaper circuits 64 and 65 yielding large rectangular pulses indicated at 66 and 67. These are differentiated, shaped and rectified, yielding pulses of very short duration, which are applied to grids 68 and 69 of triodes 70 and 71 respectively. Triodes 70 and 71 are normally biased well beyond cut-off, as indicated, by sources of potential 72 and 73. They are driven to conduction, however, by the pulses from the shaper amplifier 64 and 65. Associated with the respective plate and cathode circuits 74 and 75 of the triodes 71 and 70 respectively, are small bucket condensers indicated at 76 and 77. A comparatively large charging condenser 78 is provided in the circuit connecting the cathode of the tube 71 and the plate of the tube 70 toward ground at 79. The arrangement is such that the two bucket condensers 76 and 77 are able to discharge into the condenser 78 during the conduction periods of the tubes 70 and 71 respectively. A shunt resistance 80 provided across the condenser 78 forms for the discharge of the storage condenser, a time constant which is of the order of half a second. The output of the circuits just described, which are labeled "demodulator" in the broken line box indicated at 81 is fed into a low pass filter circuit 82. The output of the filter is the speech signal originally applied to the transmitter. The box labeled "demodulator" indicated at 14 in the transmitter schematic is identical to the circuit labeled "demodulator" in the receiver schematic.

In operation, as speech is applied to the input circuits 1 and 2, controlling the potentials on grid 3 of the triode 4, the resultant proportional current in the cathode circuit 7 of the triode 4 flowing to ground at 8 will cause a signal to appear on the plate 15 when the signals from the demodulator 14, which controls the potentials on grid 13 of the triode 11, are more positive or less negative than the audio input signals appearing simultaneously on the grid 3 of the triode 4. As apparent from the description of the circuit given hereinabove, the signals from the demodulator are essentially audio intelligence which has already been transmitted. Hence, triodes 4 and 11 function as a comparator circuit which passes a negative signal to the gate amplifier 16 if the input speech level is lower than that of the speech already transmitted and will pass no signal otherwise. The output of the demodulator 14, as well as that described in connection with the receiver circuit in Fig. 2, is substantially as indicated at 83, that is, a type of stepped voltage which is obtained from the charging condenser 78 in Fig. 2 The passage of signals through the gate amplifier is controlled by pulses obtained from the gate control shaper circuit 17 which provides such controlling pulses at a rate determined by the frequency of the sine wave generator 18. The output of the gate amplifier 16 in the form of the inverted square pulse as at 20 controls the operation of the flip-flop circuit 21 and provides thereby a rectangular pulse 22 of a given duration which begins when the sine wave from the generator 18 passes through zero phase angle if at that time a signal has been applied to the gate amplifier from the triode 11. The application of the square pulses 22 to the phase inverter 23 yields two outputs equal in shape and amplitude but opposite in sign which are applied to the triodes 24 and 25 respectively which act as balanced cathode followers, has the effect of varying the spacing between the individual pulses of pairs of pulses as at 37. Spacing in respect to time of the pulses of each pair of pulses 37, however, is a function of the voltage inserted between the split windings of the secondary 34. As a result of the circuits which have been described, this voltage assumes one of two values, depending on whether or not the cathode follower grids were pulsed. As a consequence, the time spacing of the pulses going into the shaper amplifier 39 is determined by whether the speech signal coming in is of greater or lesser amplitude than the intelligence already transmitted. For the purpose of transmission, these pulses 37 are shaped and amplified into rectangular pulses in accordance with those shown at 38. Thus, the transmitted pulses become a series of square wave shapes or rather pairs of pulses which are separated in time in accordance with the signals transmitted, that is, according to how positive or negative the respective signals are as compared to the intelligence immediately preceding and already transmitted.

The output of the receiver detector circuits 43 in the form of pairs of pulses indicated at 43 and 44 is shaped into rectangular pulses as at 48 and is then passed to the first grid of the pentode 47. The circuit associated with the pentode 47 serves to convert the time-phase modulation of the pulse pairs into amplitude modulation by combining them with sinusoidal voltages generated in the tuned circuit 49. By proper tuning of the screen circuit, the coincidence of the pulses with the screen circuit oscillations may be made such that the widely spaced pulses will appear in the output of the triode 47 superposed on a low value of the sinusoid while pulses with closer spacing will be superposed on the high values. Consequently pulses appear in the output of the pentode 47 with low amplitude for wide spacing and high amplitude for close spacing. The combined wave is then subjected to a limiting action in order to remove the sine wave pedestal, the resulting wave portions then being amplified and inverted. The resultant amplitude modulated pulses, indicated at 54 and 53, are applied to the amplitude discriminator circuit comprised of the triodes 57 and 58. These tubes are affected differently by high and low amplitude pulses so that they effectively serve to separate the high from the low amplitudes. Pulses of a short duration are ultimately obtained from the shaper amplifier circuits 64 and 65, corresponding to the respective pulse pairs 66 and 67 which differ in the time or phase by which the individual pulses are separated from one another in accordance with the modulation imposed on the cuspers as at 37. The circuits associated with the triodes 70 and 71 serve to store the pulses from the shaper amplifiers 64 and 65 in the form of unit steps of voltage. The pulses from the shaper circuit 64 and 65 control the conduction through the triodes 70 and 71 so that alternatively one of the small bucket condensers 76 or 77 is enabled to discharge into the large storage condenser in the plate circuit of the tube 70. The stepped voltage wave resulting on the condenser 78 is then "read" and applied to the low pass filter circuit 82. The condenser voltage is of the type as shown at 83 in Fig. 1. The output of the low pass filter circuit 82 is the speech signal originally applied to the transmitter.

It will be seen from the above that an effective method and means has been provided for transmitting audio or speech signals by means of pulse time modulation by using the so-called two position code, in respect to pulses which are indicative of the speech voltage wave. The modulation of the input signal in the embodiment described involves a comparison between the input signal and a detected and integrated portion of the code already transmitted a short period before the time for each pulse. If the input wave amplitude is greater than the integrated level, the code signal for a positive unit step would be transmitted; if less, the signal for a negative unit step would be transmitted. And, since the signals from the transmission lines are in the form of two-position pulses, rather crude amplifiers or trigger circuits may be used in the transmitter and at relay stations with resulting advantages.

The fidelity with which coded pulses at the repetition rate of, say, sixteen pulses per cycle, at 3500 cycles per second, that is, the speech frequency, can reproduce such speech will be discussed with reference to Fig. 3. In connection therewith, it should be noted that the components of speech which must be reproduced accurately are the fundamental and the first two regions of overtone reinforcement for vowel sounds and certain consonant components of low intensity ranging up to 3500 c. p. s. While peak intensities of the various frequency components rise from 10 to 13 db above the average level of speech for those frequencies, satisfactory reproduction may be obtained even though the peaks are clipped at lower levels, perhaps 6 db above the average. The importance of accurate reproduction of intensities in frequency falls off markedly above 2400 c. p. s. to the point that at 3500 c. p. s. mere indication of the presence of a component, in reasonably accurate phasal relation is required. In judging the efficacy of the circuit described for reproducing speech, it must be considered that the ability to cover the range of intensities is one of the requisites, as well as the ability to follow rapid changes in intensity accurately. In Fig. 3A is shown a typical sine wave which when reproduced in the form of positive and negative pulses assumes the form shown in 3B. When demodulated, the various positive and negative pulses are translated into step voltages to be formed into a curve as in Fig. 3C. It is readily apparent that the maximum amplitude speech wave will be obtained when the integrated unit steps are in the form of the latter, that is, as in Fig. 3C. Since the amplitude of each unit step is the same, intensity available is inversely proportional to the square of the frequency, which in the region between .5 and 3.5 k. c. corresponds to the natural taper of speech. To reproduce speech of less than maximum intensity, integrated unit step waves of form of Fig. 3B are available. By harmonic analysis of these wave forms it appears that with a system which is assumed to have 16 pulse periods in $\frac{1}{3500}$ per second, it is possible to represent six different amplitudes at 3500 c. p. s. sine waves. These six amplitudes are related to that of the unit steps by certain decreasing factors. At higher pulse repetition rates per cycle the number of intermediary positions increases rapidly. Thus at 1000 cycles, per second, with the same assumed pulse rate of 16 pulses per cycle, at 3500 c. p. s., intermediary amplitudes are available to within 2% of the maximum amplitude of the speech wave of any amplitude from the minimum to maximum that may be reproduced.

In Fig. 4 there is shown a speech wave and a comparative integrated unit steps when finally reproduced in the demodulator of the receiver. The noise components introduced by the deviations are considered quite tolerable under the circumstances.

While we have described above the principles of our invention in connection with specific methods and apparatus, particularly as applied to pulse time modulation, it is to be clearly understood that other characteristics of pulses may be made use of for the same purpose, this description being made only by way of example and not as a limitation on the scope of our invention.

What is claimed is:

1. A pulse modulation transmitting system, comprising a source of amplitude variable audio signals, means for providing successive pairs of spaced pulses including a generator for supplying a sine wave at a given frequency, means for deriving secondary signals having a given and a zero value depending on the relative amplitude of the signals at a given instant including a comparator circuit supplied from said audio source, means for controlling the rate of occurrence of said secondary signals controlled by said sine wave generator, means to modulate the spacing between the pulses of each pulse pair including a balanced cathode follower circuit operatively connected to said comparator circuit, means for demodulating said time modulated pulse pairs including circuit means for converting the time modulation into positive and negative voltages respectively connected to control said comparator circuit, and means for transmitting said modulated pulses connected to said pulse providing means.

2. A system according to claim 1, wherein said comparator further includes a gate amplifier, a flip-flop circuit and a phase inverter connected serially, said gate amplifier being connected for control by said sine wave generator.

3. A system according to claim 1, wherein said demodulating means includes a discriminator circuit for converting time displacements of said pulses into amplitude variations thereof.

4. A communication system comprising a signal wave source, a pulse generator adapted to produce successive pairs of pulses with the spacing between pulses of each pair being controllable, means coupled to said source for comparing the amplitude of said signal wave at a given interval thereof with its amplitude at a prior interval, means responsive to the results of said comparison for controlling the pulse generator to produce either one of only two spacings between the pulses of each pair according to whether the wave at said given interval is of greater or lesser amplitude than at said prior interval, and means for transmitting said pulse pairs.

5. A system according to claim 4 wherein said comparing means comprises means responsive to said spacing of the pulse pairs to produce a local wave, and means for comparing the amplitude of said signal wave with said local wave.

6. A system according to claim 5, wherein said means for controlling the pulse generator comprises means responsive to said comparison for applying either one of only two controlled potentials of differing values depending on whether the signal wave or the local wave is greater.

7. A system according to claim 6, wherein said potential applying means includes means for deriving control pulses when a given one of said waves is greater in amplitude than the other one, a biasing source connected to said pulse generator to control the spacing of the pulses of each pair, and means for applying said control pulses to said biasing source to change the biasing potential by a fixed amount.

8. A system according to claim 6 wherein said pulse generator comprises a source of cyclical energy, a full wave rectifier coupled to the output of said source of cyclical energy and wherein said potential applying means includes a biasing source connected to said rectifier and means for varying the biasing potential applied from said biasing source to said rectifier.

9. A system according to claim 4 wherein said comparing means comprises a demodulator circuit, and means for applying the pulse pairs to said demodulator circuit to produce an integrated wave similar to said complex intelligence wave but displaced in time therefrom.

10. A system according to claim 4, further including means for receiving said pairs of pulses, and means for demodulating said pulse pairs to substantially reproduce the amplitude variations of the original signal wave.

11. A system according to claim 10 wherein said demodulating means includes means for distinguishing between the pulse pairs according to the spacing between the pulses of each pair, means responsive to the pulse pairs of one of said spacings to increase the amplitude of a locally generated wave and means responsive to the pulse pairs of the other one of said spacings to decrease the amplitude of said locally generated wave.

EDMOND MAURICE DELORAINE.
BEN ALEXANDER.

REFERENCES CITED

The following references are of record in the file of this patent:

UNITED STATES PATENTS

| Number | Name | Date |
|---|---|---|
| 2,266,401 | Reeves | Dec. 16, 1941 |
| 2,404,306 | Luck | July 16, 1946 |
| 2,438,908 | Goodall | Apr. 6, 1948 |
| 2,466,230 | Goldberg | Apr. 5, 1949 |
| 2,467,486 | Krumhansl et al. | Apr. 19, 1949 |